US009112326B2

(12) United States Patent
Liu (10) Patent No.: US 9,112,326 B2
(45) Date of Patent: Aug. 18, 2015

(54) POWER ADAPTER WITH A COMBINATIONAL PLUG

(71) Applicant: Leader Electronics Inc., New Taipei (TW)

(72) Inventor: Feng-Rong Liu, New Taipei (TW)

(73) Assignee: Leader Electronics Inc., New Taipei (TW)

( * ) Notice: Subject to any disclaimer, the term of this patent is extended or adjusted under 35 U.S.C. 154(b) by 120 days.

(21) Appl. No.: 14/016,546

(22) Filed: Sep. 3, 2013

(65) Prior Publication Data

US 2015/0064955 A1    Mar. 5, 2015

(51) Int. Cl.
*H01R 27/00* (2006.01)
*H01R 24/68* (2011.01)
*H01R 31/06* (2006.01)
*H02J 7/00* (2006.01)
*H01R 103/00* (2006.01)
*H01R 13/506* (2006.01)

(52) U.S. Cl.
CPC .............. *H01R 24/68* (2013.01); *H01R 31/065* (2013.01); *H02J 7/00* (2013.01); *H01R 13/506* (2013.01); *H01R 2103/00* (2013.01)

(58) Field of Classification Search
CPC ..... H01R 31/06; H01R 27/00; H01R 13/6675
USPC .......... 439/171, 518, 956, 172, 151, 173, 344
See application file for complete search history.

(56) References Cited

U.S. PATENT DOCUMENTS 5,577,923 A  * 11/1996 Lee ............................... 439/170
7,264,492 B2 *  9/2007 Liang ........................... 439/171
7,563,115 B2 *  7/2009 van gen Hassend et al. . 439/171

* cited by examiner

*Primary Examiner* — Abdullah Riyami
*Assistant Examiner* — Nelson R Burgos-Guntin
(74) *Attorney, Agent, or Firm* — C. G. Mersereau; Nikolai & Mersereau, P.A.

(57) ABSTRACT

A power adapter with a combinational plug has a plug assembly and a converter assembly. The converter assembly has two guide walls formed on a bottom surface thereof for a base of the plug assembly to be inserted therein, and at least one fixing member and a positioning boss formed on the base to engage at least one engagement slot and a positioning slot formed in the base. The base is mounted within the guide walls, the at least one fixing member engages the at least one engagement slot, and the positioning boss engages the positioning slot for the plug assembly and the converter assembly to be firmly combined. The locations of the positioning boss and the positioning slot are unique for each power adapter. Accordingly, a power adapter with low production cost and misuse protection can be provided.

18 Claims, 7 Drawing Sheets

POWER ADAPTER WITH A COMBINATIONAL PLUG

BACKGROUND OF THE INVENTION

1. Field of the Invention

The present invention relates to a power adapter, and, more particularly, to a power adapter with a combinational plug.

2. Description of the Related Art

Power adapters serve to be connected between electric appliances and the mains power and are provided to convert AC (Alternating Current) power supplied by the mains power into DC (Direct Current) power required by electric appliances. The worldwide voltage values of the mains power fall in a range of 100 V to 240 V, and can be classified into a high-voltage standard and a low-voltage standard. The voltage values of the high-voltage standard fall between 220 V and 240 V, and the voltage values of the low-voltage standard fall between 100 V and 120 V.

A conventional power socket has two sets of plug terminals, and each set of plug terminals is selectively plugged into a power socket of a receptacle with a corresponding specification. The specifications of the two sets of plug terminals differ from each other for the power adapter to be plugged into two types of power sockets with different specifications. The two sets of plug terminals are pivotally and oppositely mounted on the power socket so that they can be pivoted along two opposite directions and require less space for storage. When in use, one set of plug terminals is ready to be plugged into a matching power socket by pivoting the set of plug terminals to be erected. When stored, the set of plug terminals is received in containing slots of the power socket. To convert AC power supplied by the mains power into DC power required by electric appliances, the power socket is usually mated with a matching power adapter supporting an operating voltage range between 100 V and 240 V. Due to the wide voltage range to be supported, multiple conversion circuits are required and the circuit design of the power socket becomes more complicated.

Although the mating conventional power socket and a matching power adapter can support a wide range of mains power, both are complicated in terms of structure and circuit design thereof. Such complexity leads to higher production cost. As far as user's perspective is concerned, the use of the mating conventional socket and the matching power adapter is meaningless and wasteful unless the user has a frequent need for international travel and charging to portable electronic products.

SUMMARY OF THE INVENTION

An objective of the present invention is to provide a power adapter with a combinational plug providing a power adapter and a unique plug to be combined with the power adapter, so as to provide a power adapter with low production cost and misuse protection.

To achieve the foregoing objective, the power adapter with a combinational plug has a converter assembly and a plug assembly.

The converter assembly has a bottom surface, an assembly seat, at least one fixing member, and a positioning boss.

The assembly seat has two guide walls formed on the bottom surface.

The at least one fixing member is formed on the bottom surface.

The positioning boss is formed on the bottom surface.

The plug assembly has a base, at least one engagement slot, and a positioning slot.

The base corresponds to the assembly seat in size.

The at least one engagement slot is formed in the base and respectively engages the at least one fixing member of the converter assembly.

The positioning slot is formed in the base and engages the positioning boss of the converter assembly.

The assembly seat of the converter assembly matches the base of the plug assembly in size, and the base is inserted in the assembly seat to combine the converter assembly and the plug assembly together. As the converter assembly is also equipped with a voltage conversion circuit in support of a specific mains voltage range, the circuit is relatively simple and the cost thereof is relatively low. Hence, a plug assembly matching the specifications of the mains voltage just needs to be combined with the converter assembly, thereby lowering the production cost. On the other hand, the locations of the positioning boss and the positioning slot are unique so that the converter assembly and the plug assembly won't be incorrectly assembled for the use in specified regions.

Other objectives, advantages and novel features of the invention will become more apparent from the following detailed description when taken in conjunction with the accompanying drawings.

DETAILED DESCRIPTION OF THE INVENTION

Figure 1:
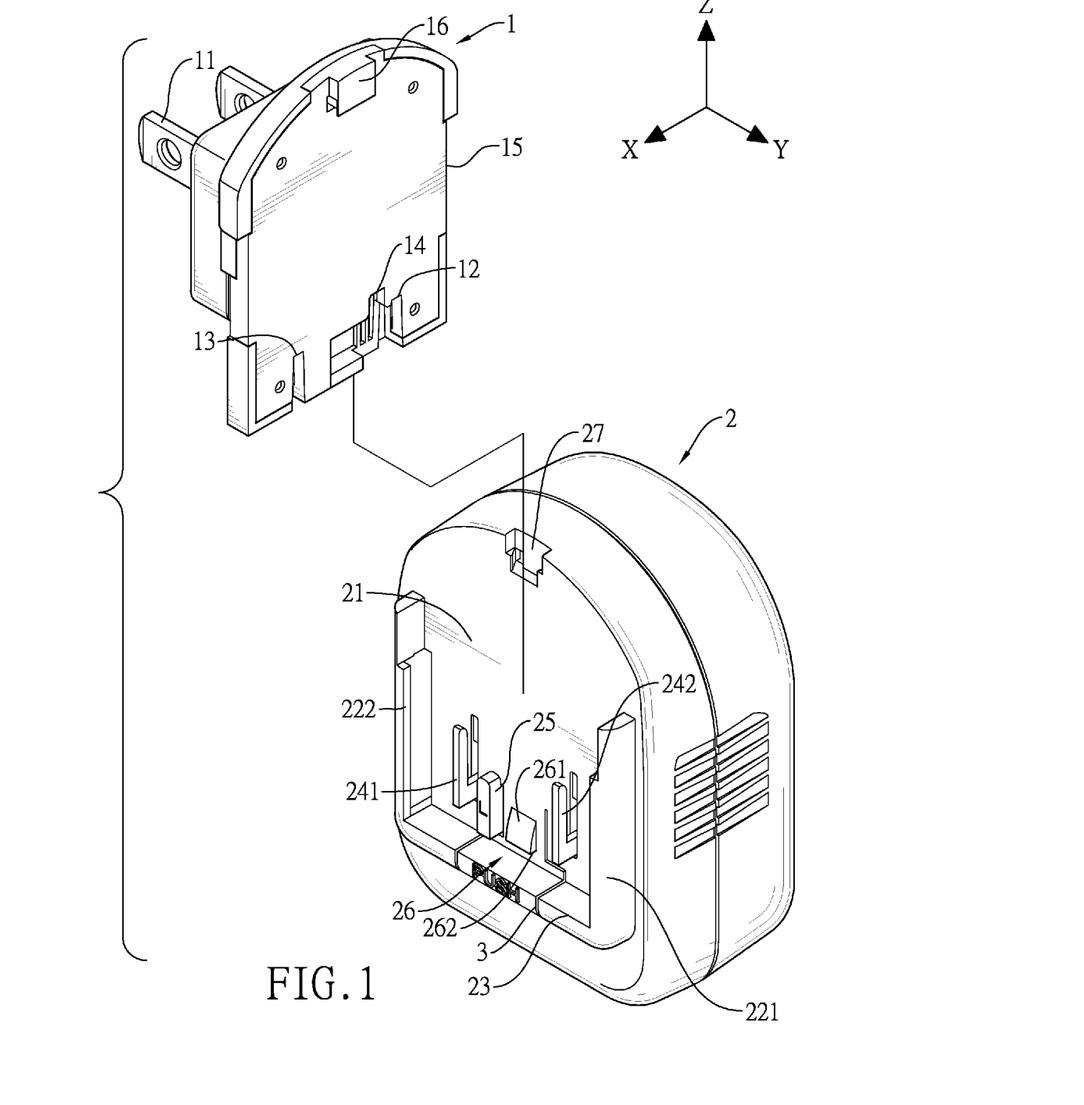
FIG. 1 is an exploded perspective view of a first embodiment of a power adapter with a combinational plug in accordance with the present invention.
Figure 2:
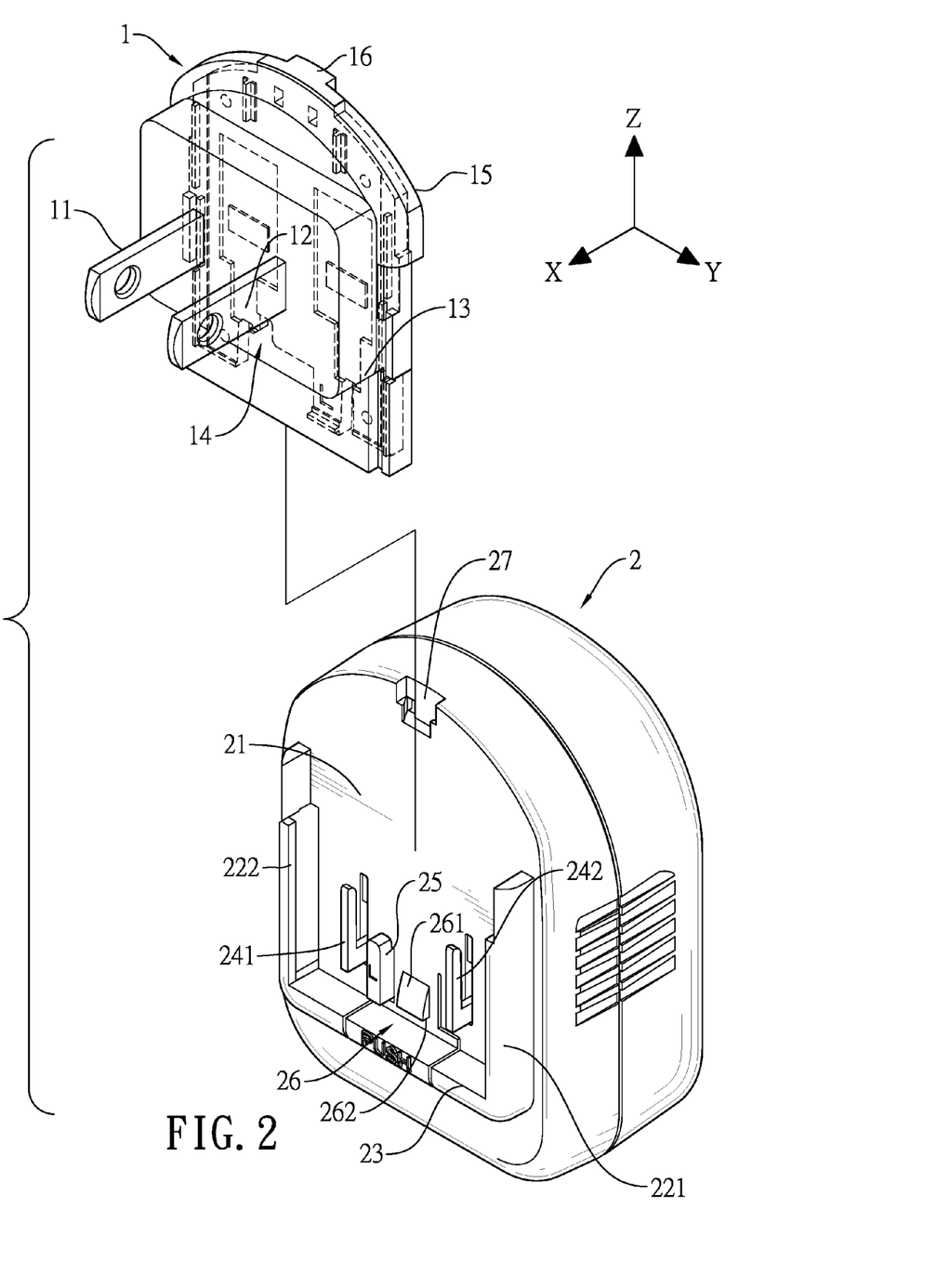
FIG. 2 is another exploded perspective view of the power adapter with a combinational plug in FIG. 1.

With reference to FIGS. 1 and 2, a first embodiment of a power adapter with a combinational plug in accordance with the present invention has a converter assembly 2 and a plug assembly 1 with a particular specification mounted on the converter assembly 2.

The converter assembly 2 has a bottom surface 21, an assembly seat, a pushing bar 23, at least one fixing member and a positioning boss 25. The bottom surface 21 is parallel to a plane defined by a second axis (Y axis) and a third axis (Z axis). The assembly seat is perpendicular to a first axis (X axis), and has two guide walls 221 and two holding ribs 222. The two guide walls 221 are formed on the bottom surface 21 and are parallel to the third axis. The pushing bar 23 is formed on the bottom surface 21 and is parallel to the second axis. Each end of the pushing bar 23 is connected with a bottom end of one of the two guide walls 221. Each holding rib 222 is formed on one of the guide walls 22 and extends inwardly along the second axis.

The at least one fixing member has a first fixing member 241 and a second fixing member 242. The first fixing member 241 and the second fixing member 242 are formed on the bottom surface 21 and are located within the two guide walls 221 and the pushing bar 23. In the present embodiment, the first fixing member 241 and the second fixing member 242 are L-shaped, and a horizontal arm of each of the first fixing member 241 and the second fixing member 242 is parallel to the first axis, and a vertical arm thereof is parallel to the third axis. The shape of each of the first fixing member 241 and the second fixing member 242 targets at increasing an engagement area when engaging the plug assembly 1.

The positioning boss 25 is slender and rectangular, is formed on the bottom surface 21 and between the first fixing member 241 and the second fixing member 242, and is adjacent to the first fixing member 241. A longitudinal direction of the positioning boss 25 is parallel to the third axis. The positioning boss 25 is used to correspond to the plug assembly 1 with the particular specification.

The plug assembly 1 has a base 15, a set of prongs 11, a first engagement slot 12, a second engagement slot 13, and a positioning slot 14.

The size of the base 15 corresponds to the size of the assembly seat of the converter assembly 2, and the base 15 is slidably mounted in the assembly seat when two sides of the base 15 are respectively slid through two sliding tracks formed by the guide walls 221 and the holding ribs 222.

The set of prongs 11 includes two prongs to be electrically connected to a mains power socket. In the present embodiment, the set of prongs 11 complies with U.S. mains power specifications, which is 110V AC power. In other words, the plug assembly 10 is intended for the use in U.S.A.

The first engagement slot 12 and the second engagement slot 13 are formed in a bottom of the base 15 and are respectively adjacent to the two sliding sides of the base 15.

The positioning slot 14 is formed in the bottom of the base 15, is located between the first engagement slot 12 and the second engagement slot 13, and is closer to the first engagement slot 12 than to the second engagement slot 13. The first engagement slot 12 and the second engagement slot 13 respectively engage the first fixing member 241 and the second fixing member 242. The positioning boss 25 engages the positioning slot 14.

The converter assembly 2 further has a locking protrusion 26. The locking protrusion 26 is resilient and formed on the bottom surface 21 of the converter assembly 2, and has a curved portion. The curved portion has a sloped surface 261 and a stop surface 262. The sloped surface 261 ascends toward the pushing bar 23. The stop surface 262 is connected to a top edge of the sloped surface 261 and faces the pushing bar 23. When the plug assembly 1 is inserted in the assembly seat and contacts the bottom surface 21 of the converter, a bottom portion of the plug assembly 1 is held between the pushing bar 23 and the stop surface 262 of the locking protrusion 26 after passing the sloped surface 261.

The plug assembly 1 further has a rectangular insert 16. The rectangular insert 16 is formed on a top edge of the base 15 and protrudes along a direction opposite to the set of prongs 11, and has a dovetail tenon formed on a bottom of the rectangular insert 16. The converter assembly 2 has a rectangular slot 27. The rectangular slot 27 is formed in a top edge of the bottom surface 21 of the converter assembly 2 to correspond to the rectangular insert 16 of the plug assembly 1, and has a dovetail slot formed in a bottom portion of the rectangular slot 27. When the rectangular insert 16 engages the rectangular slot 27, the dovetail tenon of the rectangular insert 16 and the dovetail slot form a dovetail joint to provide a better engagement structure.

The power adapter with a combinational plug further has two cuts 3 incised through the pushing bar 23 and the bottom surface 21 of the converter assembly 2 for a portion of the pushing bar 23 and the bottom surface 21 between the cuts 3 to be pressed down and bounce back in an elastic manner.

Figure 3:
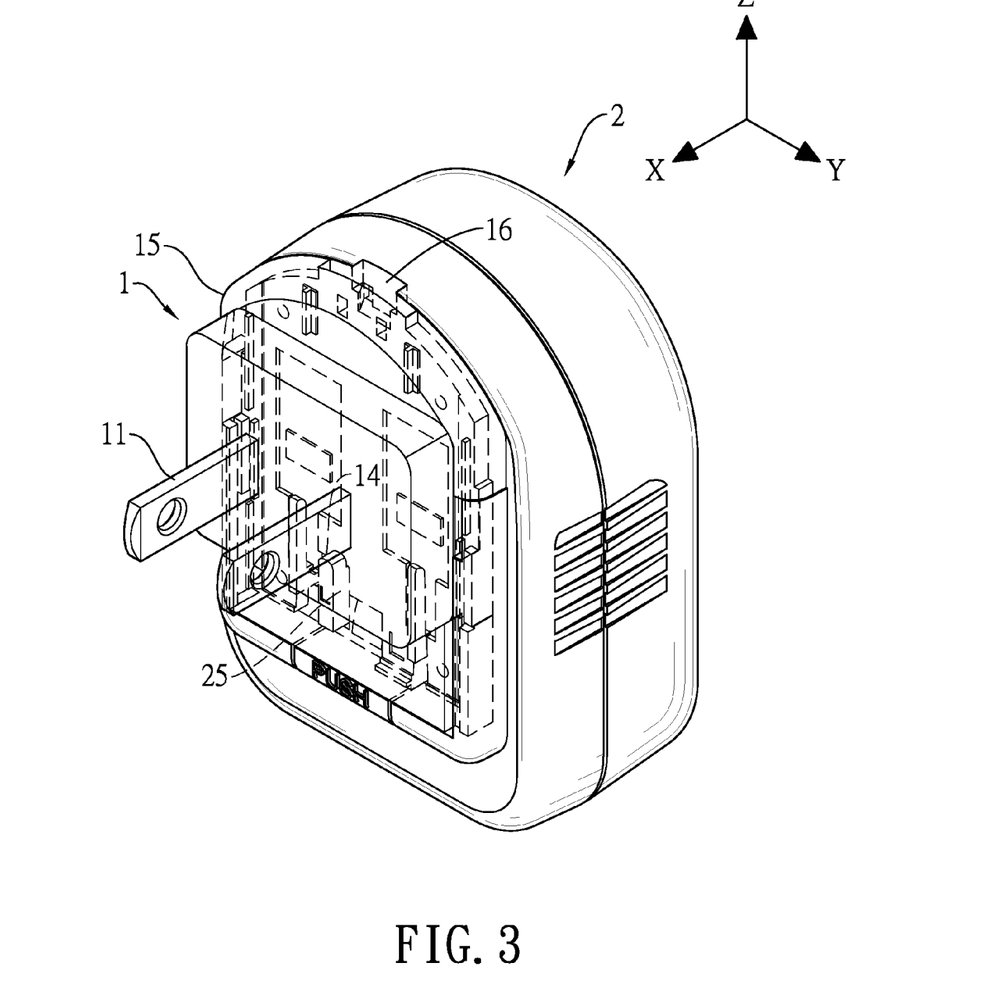
FIG. 3 is a perspective view of the power adapter with a combinational plug in FIG. 1.

With reference to FIG. 3, the converter assembly 2 and the plug assembly 1 can be combined as a whole. The plug assemblies 1 with specifications suitable for different regions can be distinguished by the positions of the positioning boss 25 and the positioning slot 14. The converter assembly 2 just needs simple modification upon production for the converter assembly 2 to be combined with the plug assembly 1 with different specifications.

For example, the voltage values of the mains power around the world normally fall in a range of 100 V to 240 V, and can be classified into a high-voltage standard and a low-voltage standard. The mains voltage values of the high-voltage standard ranges from 220 V to 240 V, such as 220 V in European area, and the mains voltage values of the low-voltage standard ranges from 100 V to 120 V, such as 100 V to 120 V in U.S.A, Taiwan, Japan, and the like. The present invention focuses on providing matching sets of converter assemblies 2 and plug assemblies 1 for the high-voltage standard and the low-voltage standard. Hence, incorrect assembly of the converter assemblies and the plug assemblies can be easily avoided, so that internal circuits of the converter assemblies 2 and the plug assemblies 1 just need to be designed with simple and specific power specifications without requiring complicated and expensive circuits. Accordingly, the cost-down effect in production can be addressed.

Figure 4:
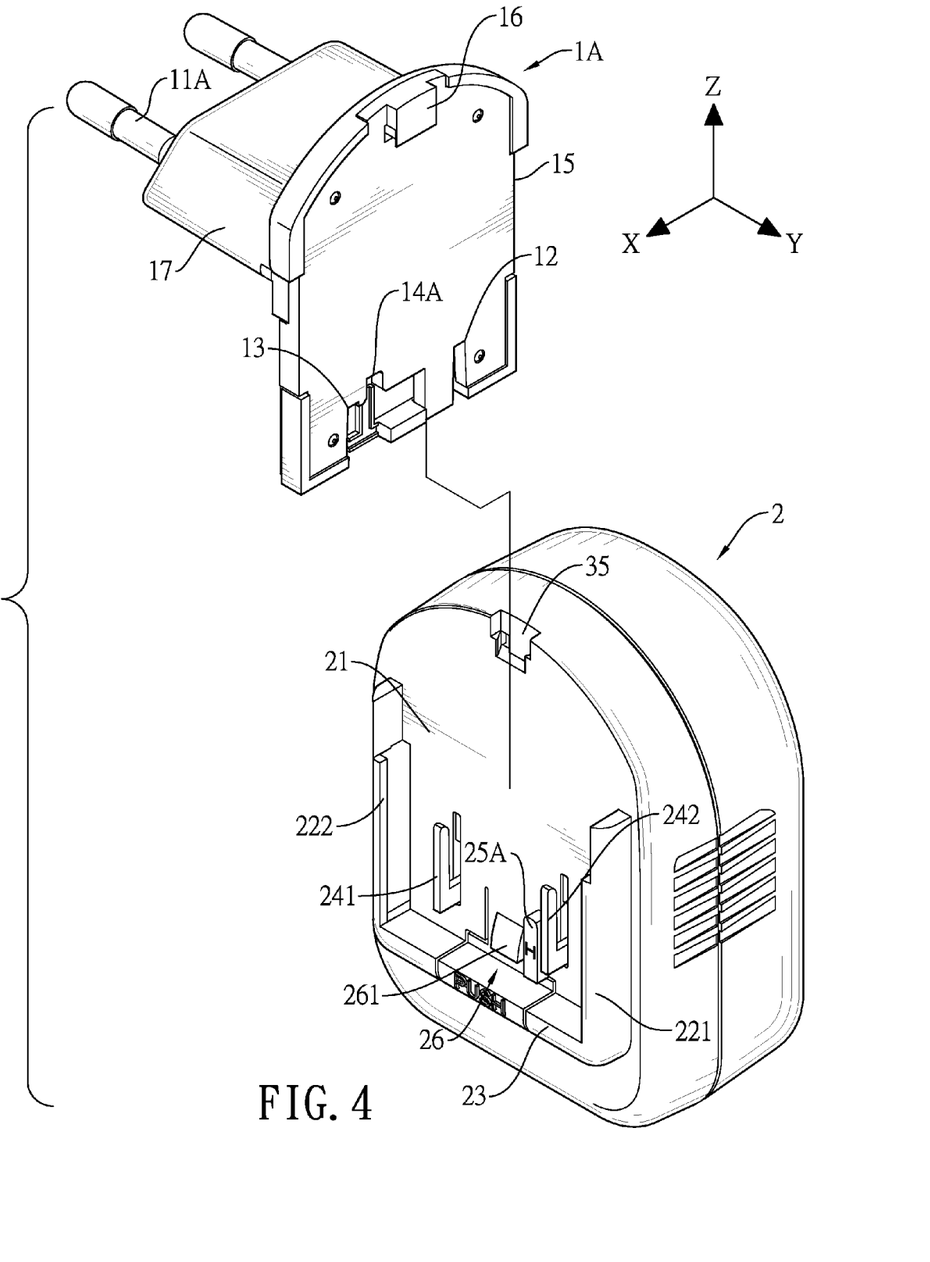
FIG. 4 is an exploded perspective view of a second embodiment of a power adapter with a combinational plug in accordance with the present invention.
Figure 5:
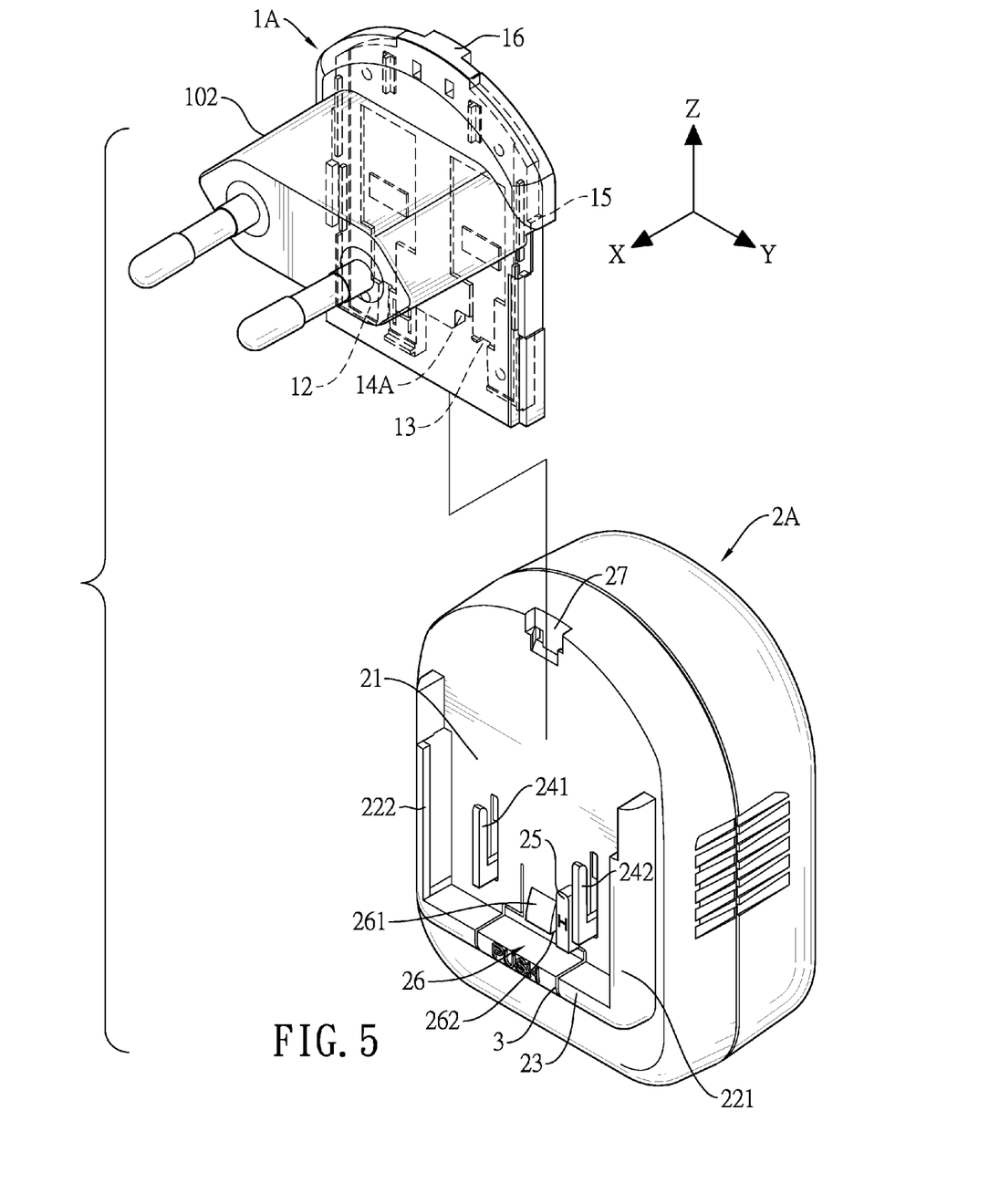
FIG. 5 is another exploded perspective view of the power adapter with a combinational plug in FIG. 4.

With reference to FIGS. 4 and 5, a second embodiment of a power adapter with a combinational plug in accordance with the present invention is substantially the same as the first embodiment except that the present embodiment has a different plug assembly 1A. The plug assembly 1A has an extended portion 17 and two power pins 11A. The extended portion 17 is formed on and protruded outwards from an outer surface of the plug assembly 1A. The two power pins 11A are mounted through the extended portion 17 to electrically connect to the mains power. The two power pins 11A may be round power pins to meet the European 220 V mains power specifications.

In the present embodiment, the positioning boss 25A is formed on the bottom surface 21 of the converter assembly 2A and is adjacent to the second fixing member 242 to correspond to the positioning slot 14A of the plug assembly 1A.

Figure 6:
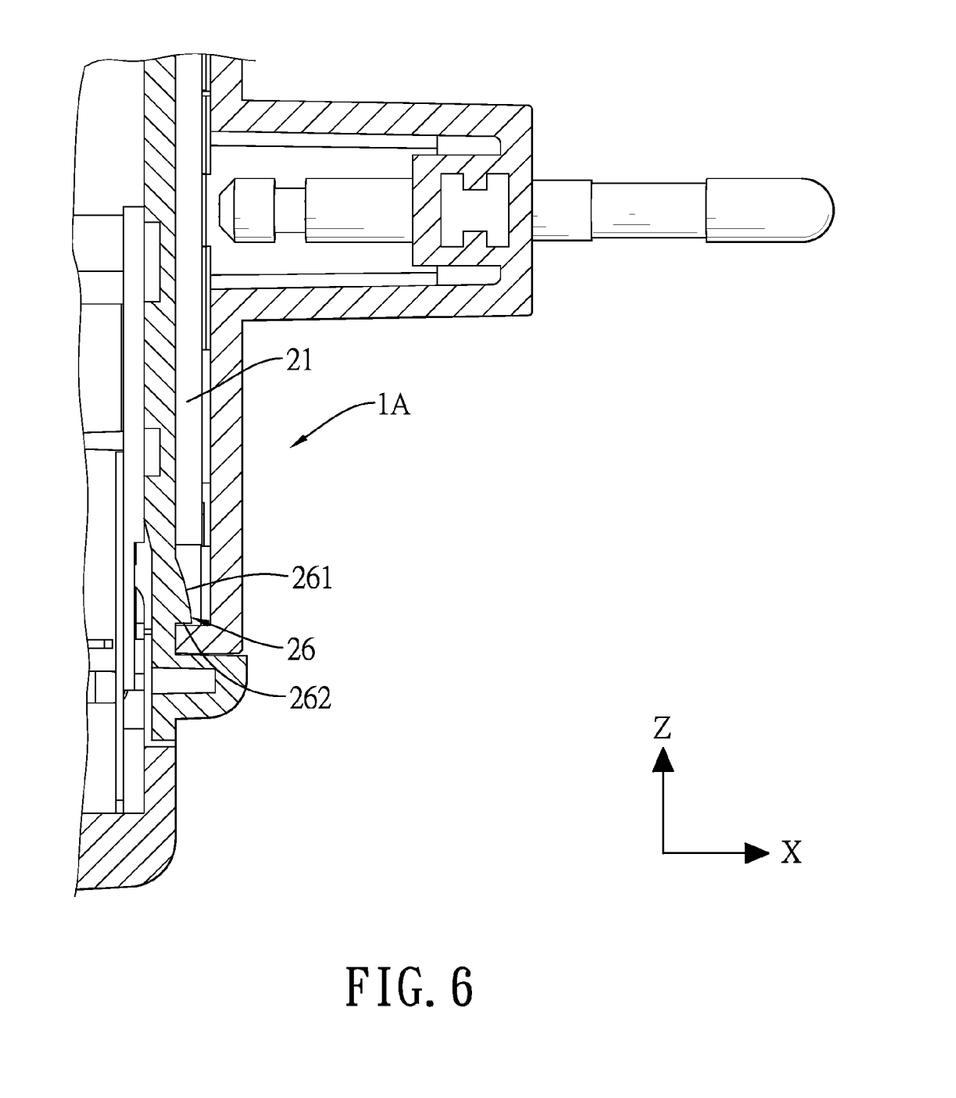
FIG. 6 is an enlarged side view in partial section of the power adapter with a combinational plug in FIG. 4.
Figure 7:
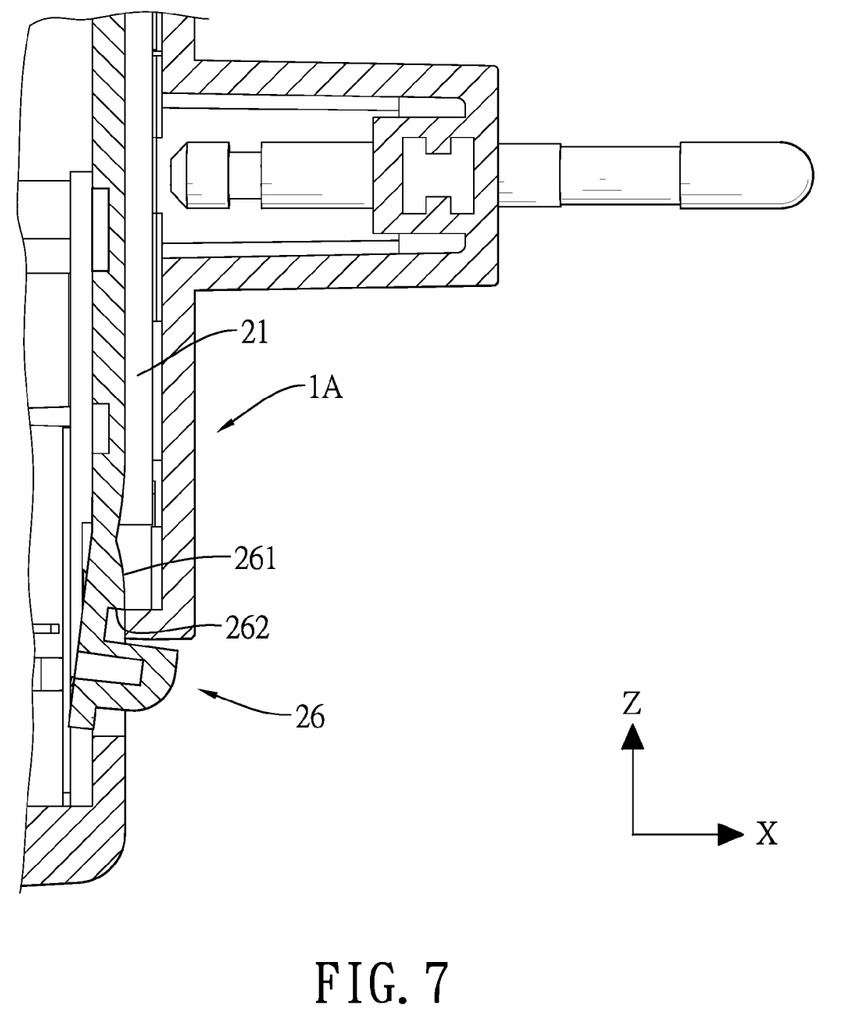
FIG. 7 is an enlarged operational side view in partial section of the power adapter with a combinational plug in FIG. 5.

With reference to FIGS. 6 and 7, the operation of combining and detaching the plug assembly 1A and the matching converter assembly 2A is illustrated. When the plug assembly 1A is combined with the converter assembly 2A, the bottom of the base 15 of the plug assembly 1 contacts the bottom surface 21 of the converter assembly 20, and a bottom portion of the plug assembly 1A is held between the pushing bar 23 and the stop surface 262 of the locking protrusion 26 after passing the sloped surface 261 of the locking protrusion 26. When the plug assembly 1A is detached from the converter assembly 2A, the portion of the pushing bar 23 between the cuts 3 is pressed. Due to the elasticity of the pushing bar 23 and the bottom surface 21 of the converter assembly 2A, the portion of the pushing bar 23 between the cuts 3 along with the locking protrusion 26 are moved inwards so that the bottom portion of the plug assembly 1A disengages from the holding between the pushing bar 23 and the stop surface 262 of the locking protrusion 26, and the plug assembly 1A can be removed from the converter assembly 2A. Given the foregoing combining and detaching means, convenient operation and replacement can be achieved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power adapter with a combinational plug, comprising:
 a converter assembly having:
  a bottom surface;
  an assembly seat having two guide walls formed on the bottom surface;
  at least one fixing member formed on the bottom surface; and
  a positioning boss formed on the bottom surface; and
 a plug assembly having:
  a base corresponding to the assembly seat in size;
  at least one engagement slot formed in the base and respectively engaging the at least one fixing member of the converter assembly; and
  a positioning slot formed in the base and engaging the positioning boss of the converter assembly.

2. The power adapter as claimed in claim 1, wherein
 the at least one fixing member of the converter assembly has a first fixing member and a second fixing member formed on the bottom surface and between the two guide walls; and
 the plug assembly further has a first engagement slot and a second engagement slot formed in a bottom of the base and being respectively adjacent to two sides of the base, and the first engagement slot and the second engagement slot respectively engage the first fixing member and the second fixing member of the converter assembly.

3. The power adapter as claimed in claim 2, wherein the first fixing member and the second fixing member are L-shaped.

4. The power adapter as claimed in claim 3, wherein the positioning boss is slender and rectangular, is formed on the bottom surface and between the first fixing member and the second fixing member.

5. The power adapter as claimed in claim 4, wherein a locking protrusion being resilient is formed on the bottom surface of the converter assembly, and has a curved portion, and the curved portion has a sloped surface and a stop surface.

6. The power adapter as claimed in claim 5, wherein
 the plug assembly further has a rectangular insert formed on a top edge of the base of the plug assembly; and
 the converter assembly has a rectangular slot formed in a top edge of the bottom surface of the converter assembly to correspond to the rectangular insert.

7. The power adapter as claimed in claim 6, wherein
 the rectangular insert has a dovetail tenon formed on a bottom of the rectangular insert; and
 the rectangular slot has a dovetail slot formed in a bottom portion of the rectangular slot.

8. The power adapter as claimed in claim 7, wherein the plug assembly has a set of prongs including two prongs to be adapted to electrically connect to a mains power socket.

9. The power adapter as claimed in claim 7, wherein the plug assembly has:
 an extended portion formed on and protruding outwards from an outer surface of the plug assembly; and
 two power pins mounted through the extended portion and being round power pins.

10. The power adapter as claimed in claim 1, wherein the converter assembly has:
 a pushing bar formed on the bottom surface of the converter assembly with each end of the pushing bar connected with a bottom end of one of the two guide walls;
 two holding ribs, each holding rib formed on and extending inwardly from a top edge of one of the guide walls, wherein each holding rib and a corresponding guide wall form a sliding track; and wherein the power adapter further comprises two cuts incised through the pushing bar and the bottom surface of the converter assembly for a portion of the pushing bar and the bottom surface between the cuts to be pressed down and bounce back in an elastic manner.

11. The power adapter as claimed in claim 2, wherein the converter assembly has:
 a pushing bar formed on the bottom surface of the converter assembly with each end of the pushing bar connected with a bottom end of one of the two guide walls;
 two holding ribs, each holding rib formed on and extending inwardly from a top edge of one of the guide walls, wherein each holding rib and a corresponding guide wall form a sliding track; and
 wherein the power adapter further comprises two cuts incised through the pushing bar and the bottom surface of the converter assembly for a portion of the pushing bar and the bottom surface between the cuts to be pressed down and bounce back in an elastic manner.

12. The power adapter as claimed in claim 3, wherein the converter assembly has:
 a pushing bar formed on the bottom surface of the converter assembly with each end of the pushing bar connected with a bottom end of one of the two guide walls;
 two holding ribs, each holding rib formed on and extending inwardly from a top edge of one of the guide walls, wherein each holding rib and a corresponding guide wall form a sliding track; and
 wherein the power adapter further comprises two cuts incised through the pushing bar and the bottom surface of the converter assembly for a portion of the pushing bar and the bottom surface between the cuts to be pressed down and bounce back in an elastic manner.

13. The power adapter as claimed in claim 4, wherein the converter assembly has:
 a pushing bar formed on the bottom surface of the converter assembly with each end of the pushing bar connected with a bottom end of one of the two guide walls;
 two holding ribs, each holding rib formed on and extending inwardly from a top edge of one of the guide walls, wherein each holding rib and a corresponding guide wall form a sliding track; and
 wherein the power adapter further comprises two cuts incised through the pushing bar and the bottom surface of the converter assembly for a portion of the pushing bar and the bottom surface between the cuts to be pressed down and bounce back in an elastic manner.

14. The power adapter as claimed in claim 5, wherein the converter assembly has:
 a pushing bar formed on the bottom surface of the converter assembly with each end of the pushing bar connected with a bottom end of one of the two guide walls;
 two holding ribs, each holding rib formed on and extending inwardly from a top edge of one of the guide walls, wherein each holding rib and a corresponding guide wall form a sliding track; and
 wherein the power adapter further comprises two cuts incised through the pushing bar and the bottom surface of the converter assembly for a portion of the pushing bar and the bottom surface between the cuts to be pressed down and bounce back in an elastic manner.

15. The power adapter as claimed in claim 6, wherein the converter assembly has:
   a pushing bar formed on the bottom surface of the converter assembly with each end of the pushing bar connected with a bottom end of one of the two guide walls;
   two holding ribs, each holding rib formed on and extending inwardly from a top edge of one of the guide walls, wherein each holding rib and a corresponding guide wall form a sliding track; and
   wherein the power adapter further comprises two cuts incised through the pushing bar and the bottom surface of the converter assembly for a portion of the pushing bar and the bottom surface between the cuts to be pressed down and bounce back in an elastic manner.

16. The power adapter as claimed in claim 7, wherein the converter assembly has:
   a pushing bar formed on the bottom surface of the converter assembly with each end of the pushing bar connected with a bottom end of one of the two guide walls;
   two holding ribs, each holding rib formed on and extending inwardly from a top edge of one of the guide walls, wherein each holding rib and a corresponding guide wall form a sliding track; and
   wherein the power adapter further comprises two cuts incised through the pushing bar and the bottom surface of the converter assembly for a portion of the pushing bar and the bottom surface between the cuts to be pressed down and bounce back in an elastic manner.

17. The power adapter as claimed in claim 8, wherein the converter assembly has:
   a pushing bar formed on the bottom surface of the converter assembly with each end of the pushing bar connected with a bottom end of one of the two guide walls;
   two holding ribs, each holding rib formed on and extending inwardly from a top edge of one of the guide walls, wherein each holding rib and a corresponding guide wall form a sliding track; and
   wherein the power adapter further comprises two cuts incised through the pushing bar and the bottom surface of the converter assembly for a portion of the pushing bar and the bottom surface between the cuts to be pressed down and bounce back in an elastic manner.

18. The power adapter as claimed in claim 9, wherein the converter assembly has:
   a pushing bar formed on the bottom surface of the converter assembly with each end of the pushing bar connected with a bottom end of one of the two guide walls;
   two holding ribs, each holding rib formed on and extending inwardly from a top edge of one of the guide walls, wherein each holding rib and a corresponding guide wall form a sliding track; and
   wherein the power adapter further comprises two cuts incised through the pushing bar and the bottom surface of the converter assembly for a portion of the pushing bar and the bottom surface between the cuts to be pressed down and bounce back in an elastic manner.

* * * * *